June 28, 1932.   D. C. GILHAM   1,865,097
MOLDING PROCESS
Filed May 1, 1931

Inventor
Dilman C. Gilham
By Watson E. Coleman.
Attorney

Patented June 28, 1932

1,865,097

UNITED STATES PATENT OFFICE

DILMAN C. GILHAM, OF SCHUYLKILL HAVEN, PENNSYLVANIA

MOLDING PROCESS

Application filed May 1, 1931. Serial No. 534,347.

This invention relates to improvements in the process of forming bodies of edible material and relates particularly to an improved process for forming such bodies of materials of contrasting colors.

The primary object of the present invention is to provide a novel process of molding bodies such for example as bodies of candy, of a material of one color and having imbedded therein a material of a different color, the process being such as to produce a finished article in which no edge or ridge is apparent at the point of jointure between the portions of contrasting colors.

While the present process is applicable to all operations where a congealable substance is cast in a mold, it is designed primarily for the manufacture of candy bodies and particularly hollow candy bodies such as those which are made of chocolate.

The invention will be best understood from a consideration of the following detailed description taken in connection with the accompanying drawing forming part of this specification, with the understanding, however, that the invention is not confined to any strict conformity with the showing of the drawing but may be changed or modified so long as such changes or modifications mark no material departure from the salient features of the invention as expressed in the appended claims.

In the drawing:—

Figure 1:
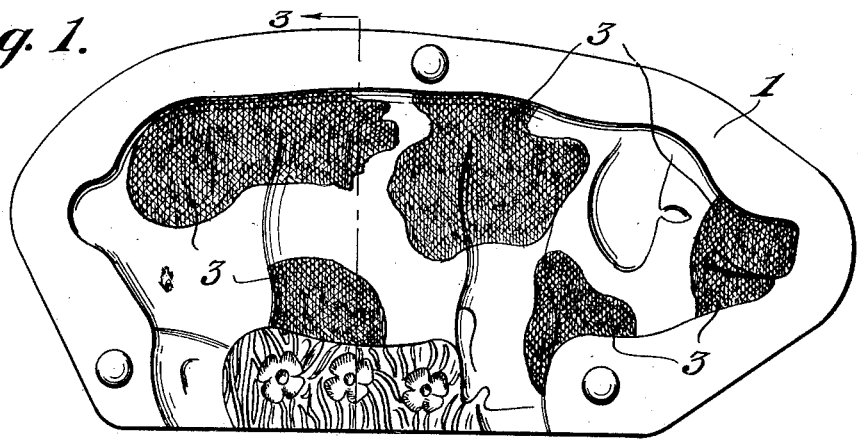
Figure 1 is a view of the interior of one-half of a mold.

Referring now more particularly to the drawing wherein like numerals of reference designate corresponding parts throughout the several views, the numerals 1 indicate the portions of a mold of the character commonly employed by confectioners for the formation of candy animals or the like, the particular mold here shown being made for the formation of a candy pig. These mold sections are secured together for the casting of the animal and the material used such for example as chocolate, is poured thereinto through the open bottom portion until the mold is filled. The mold is then chilled so as to congeal a substantial portion of the chocolate which lies thereagainst and the still fluid central portion is then poured out leaving the cast animal in the form of a shell. The bottom is then closed in the usual manner as for example by spreading a layer of chocolate upon a waxed paper surface and placing the open part of the mold over this layer of chocolate so as to fill the opening. The entire animal is thus formed throughout of a material of one shade or character. As, for example, if the animal is formed of chocolate, the color of the same will be the same throughout.

Figure 2:
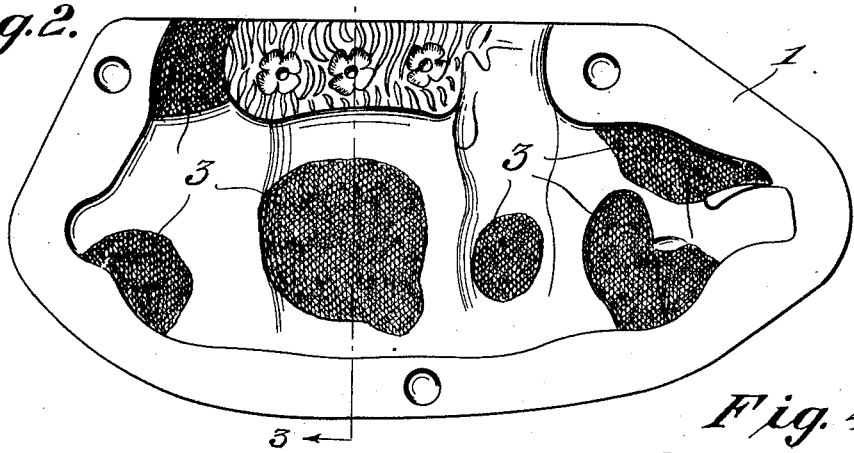
Figure 2 is a view of the other half of the mold showing upon the two mold halves the first step of the process embodying the present invention.
Figure 5:
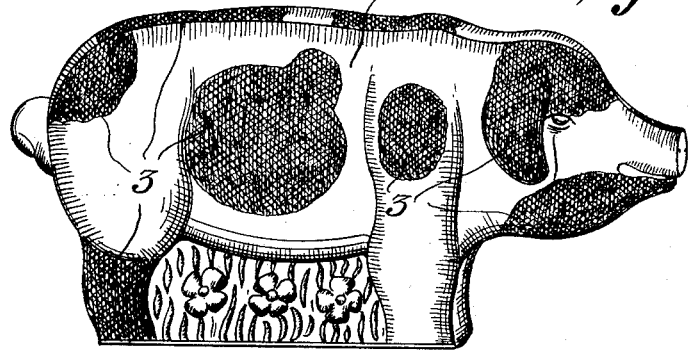
Figure 5 is a view of a body completed in accordance with the present process.
Figures 3, 4:
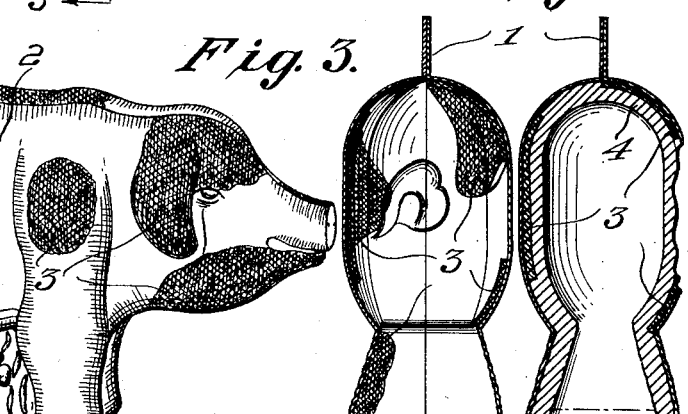
Figure 3 is a sectional view taken on the line 3—3 of the mold halves illustrated in Figures 1 and 2 showing the same in closed condition.
Figure 4 is a sectional view similar to Figure 3 but illustrating the complete formation of the edible body in the mold.

In carrying out the present process, areas of the body formed may be produced with a color contrasting with the color of the major portion of the body. For example, for the formation of a chocolate pig of the character shown and indicated by the numeral 2, the molds are first laid out in the manner shown in Figures 1 and 2 and areas upon the inner surface of each section, are covered with dark chocolate as indicated at 3. The mold sections are then chilled in any suitable manner so as to thoroughly congeal these applied portions of chocolate, and the mold sections are then put together and the entire mold is filled with melted chocolate of a light color. The mold is then chilled in the usual manner so as to congeal a thick portion of the light chocolate over the inner surface thereof, as indicated by the numeral 4 and after this operation is completed, assuming, of course, that the animal is to be formed in the nature of a shell rather than solid, the fluid center part thereof is poured out and the bottom of the mold closed, in the manner previously described.

Upon opening the mold it will be found that the body formed will have dark areas or spots made up of the darkened or bitter chocolate which was applied first to the mold sections in the manner indicated by the numeral 3. These inlaid areas of darkened chocolate will be perfectly smooth with the surface of the lighter chocolate.

While the description of the present process has been confined to the formation of a chocolate animal it is to be understood that the process may be employed for the formation of other molded bodies, either bodies formed as shells or solid, therefore the present invention is not to be understood as confined to the formation of animals alone or bodies of chocolate.

Having thus described the invention, what is claimed is:—

1. The herein described process of molding bodies in shell form from congealable materials of contrasting colors, which consists in making an application of a material of one color to a selected area of the surface of the mold, then congealing the applied material to a hard condition, then filling the mold with a material of another color, then chilling the mold to cause the congealation of the outer portion of the second filling, then removing the uncongealed central part of the second filling, and finally closing the shell thus formed and removing the body from the mold.

2. The herein described process of molding hollow edible bodies which consists in applying to a selected area of a mold, a melted normally hard edible material, then chilling the applied material to harden the same, then filling the mold with a melted normally hard edible material of a different color from the first applied material, then chilling the mold and contents sufficiently to harden only an outer portion of the body of melted material filling the same, and finally removing the unhardened central portion of the melted material.

In testimony whereof I hereunto affix my signature.

DILMAN C. GILHAM.